(12) United States Patent
Rupprecht

(10) Patent No.: US 12,075,964 B2
(45) Date of Patent: Sep. 3, 2024

(54) FLANGE ARRANGEMENT FOR A FILTER UNIT

(71) Applicant: Hilti Aktiengesellschaft, Schaan (LI)

(72) Inventor: Hans Rupprecht, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 1514 days.

(21) Appl. No.: 16/347,882

(22) PCT Filed: Oct. 31, 2017

(86) PCT No.: PCT/EP2017/077900
§ 371 (c)(1),
(2) Date: May 7, 2019

(87) PCT Pub. No.: WO2018/083090
PCT Pub. Date: May 11, 2018

(65) Prior Publication Data
US 2019/0307303 A1    Oct. 10, 2019

(30) Foreign Application Priority Data
Nov. 7, 2016 (EP) .................................. 16197481

(51) Int. Cl.
| A47L 9/00 | (2006.01) |
| A47L 9/14 | (2006.01) |
| B23Q 11/10 | (2006.01) |
| B28D 7/02 | (2006.01) |

(52) U.S. Cl.
CPC ............. *A47L 9/1427* (2013.01); *B23Q 11/10* (2013.01); *B28D 7/02* (2013.01)

(58) Field of Classification Search
CPC .......... A47L 9/1427; B23Q 11/10; B28D 7/02
USPC .......................................................... 55/378
See application file for complete search history.

(56) References Cited

U.S. PATENT DOCUMENTS 5,226,941 A * 7/1993 Uibel .................... A47L 9/1445
                                                        55/377
5,230,724 A * 7/1993 Marafante ............. A47L 9/1445
                                                        55/377
5,297,311 A * 3/1994 Puri ...................... A47L 9/1436
                                                        15/352

(Continued)

FOREIGN PATENT DOCUMENTS

| CN | 102123646 A | 7/2011 |
| DE | 29821276 | 3/1999 |

(Continued)

OTHER PUBLICATIONS

International Search Report of PCT/EP2017/077900, dated Feb. 21, 2018.

*Primary Examiner* — T. Bennett McKenzie
(74) *Attorney, Agent, or Firm* — Davidson Kappel LLC

(57) ABSTRACT

A flange unit for a filter unit for positioning in a water treatment device, the water treatment device including a water reservoir and a suction head. The flange unit includes a base plate having a central recess for accommodating a filling piece of the suction head, a connecting unit for detachably connecting the flange unit to an inner side of the water reservoir, a closure element for closing the recess, and a handle unit for detaching the connecting unit from the flange holding device and for carrying the filter unit.

8 Claims, 16 Drawing Sheets

(56) References Cited

U.S. PATENT DOCUMENTS

| | | | | |
|---|---|---|---|---|
| 5,468,271 A * | 11/1995 | Sauer | ................... | A47L 9/1436 |
| | | | | 55/377 |
| 6,033,451 A * | 3/2000 | Fish | ................... | A47L 9/1427 |
| | | | | 55/377 |
| 7,410,074 B1 * | 8/2008 | Brunning | ............... | B44D 3/126 |
| | | | | 220/570 |
| 9,138,888 B1 * | 9/2015 | Worden | ................... | B25G 3/38 |
| 10,136,783 B2 | 11/2018 | Jung et al. | | |
| 2002/0020155 A1 * | 2/2002 | Stokmans | ............. | A47L 9/1436 |
| | | | | 55/374 |
| 2003/0201198 A1 * | 10/2003 | Gantert | ................... | A45C 5/00 |
| | | | | 206/317 |
| 2007/0214755 A1 * | 9/2007 | Corney | ................. | A47L 9/1445 |
| | | | | 55/367 |
| 2007/0295768 A1 * | 12/2007 | Gringer | ............. | B65D 25/2829 |
| | | | | 222/570 |
| 2009/0217481 A1 * | 9/2009 | Matter | ................... | A47L 9/1436 |
| | | | | 29/428 |
| 2009/0223969 A1 * | 9/2009 | Bouie | ................... | B65D 55/16 |
| | | | | 220/375 |
| 2010/0224699 A1 * | 9/2010 | Gaddis | ................. | B05B 7/2491 |
| | | | | 239/311 |
| 2012/0216494 A1 * | 8/2012 | Schultink | .............. | A47L 9/1445 |
| | | | | 55/378 |
| 2014/0352102 A1 * | 12/2014 | Schultink | .............. | A47L 9/1445 |
| | | | | 15/347 |
| 2017/0129138 A1 | 5/2017 | Sever et al. | | |

FOREIGN PATENT DOCUMENTS

| | | |
|---|---|---|
| DE | 102005041811 | 3/2007 |
| DE | 202008001391 | 6/2009 |
| DE | 102014107732 | 3/2015 |
| EP | 2960012 | 12/2015 |
| WO | WO 2015185500 | 12/2015 |

* cited by examiner

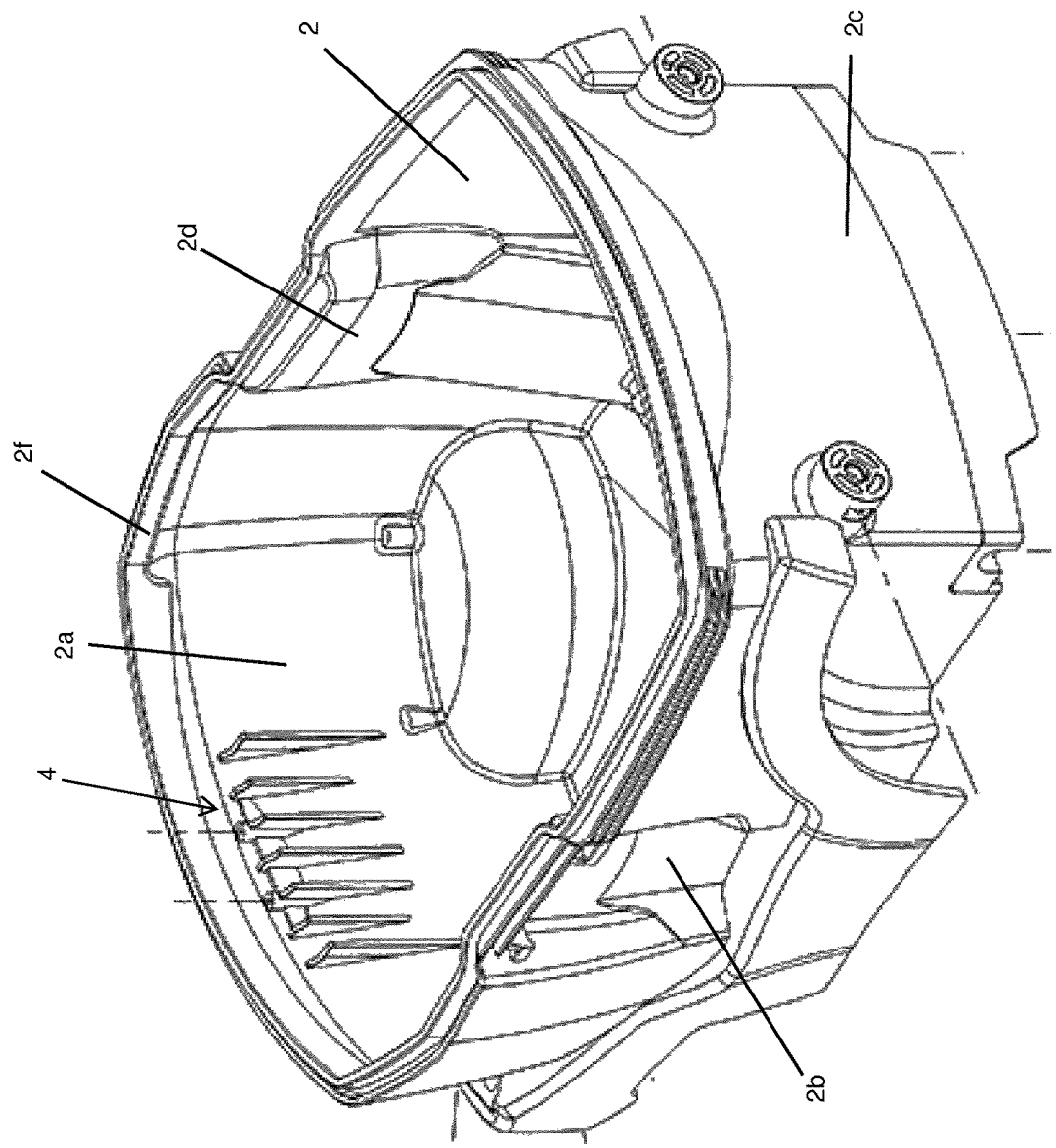
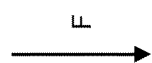

FLANGE ARRANGEMENT FOR A FILTER UNIT

The present invention relates to a flange unit for a filter unit to be positioned in a water treatment device, the water treatment device including a water reservoir and a suction head.

BACKGROUND

Water treatment devices represent a water recycling system in which water circulates in a closed circuit with a core drilling machine or a circular saw. However, according to an alternative operating mode of the water treatment device it is also possible that water does not circulate in a circuit with the power tools, but rather is only conveyed from the water treatment device to the power tools. When core drilling machines or circular saws are used for cutting a mineral material, for example, concrete or stone, it is necessary to cool and flush the tool, i.e., the drill bit or the saw blade. The flushing of the tool is used to wash off dust and slurry, which arises during the machining of the material, from the tool. The tool of a core drilling machine or a circular saw is typically cooled and flushed using water. The water is provided for this purpose in a water treatment device. Water is stored in a receptacle of the water treatment device. The receptacle may also be referred to as a water reservoir. With the aid of a water pump, which is located in a so-called suction head of the water treatment device and is typically positioned above the water reservoir, the water is conveyed via a water line (water hose) to the tools. The water runs in a circuit, so that water is conveyed back to the water treatment device again in a second water line (water hose) after the tools (drill bit or saw blade) have been cooled and flushed. However, the water is soiled with dust and slurry, which forms during the machining of the material, by the cooling and flushing of the tool. So as not to damage the components and in particular the pump of the water treatment device with the dust or slurry, the soiled water has to be filtered. A filter unit is located in the water treatment device for this purpose. The filter unit is typically designed in the form of a filter bag, through which the water is filtered before it arrives back in the water reservoir and may again be conveyed by the pump of the suction head to the tools.

To avoid damage to the water treatment device or to individual components of the water treatment device, in particular the pump, soiled water may not be conveyed by the pump.

A flange unit is provided for fastening the filter unit in the water treatment device. With the aid of the flange unit, the filter unit is removably attached to an inner side of the water reservoir. In addition to the function of filtering dirt and impurities out of the water, the filter unit has to fulfill a variety of further functions. Thus, for example, proper positioning of the filter unit in the water treatment device, a simple removal and transportation option, and a closure option, in particular for a filled filter unit, have to be provided.

SUMMARY OF THE INVENTION

However, these further (above-mentioned) functions are either not provided or are implemented very complexly in the filter units on the market or in the filter units according to the prior art.

It is an object of the present invention to solve the above-mentioned problem, so that a filter unit may be provided for a water treatment device, which includes a variety of additional functions in a simple manner.

The present invention provides a flange unit for a filter unit for positioning in a water treatment device, the water treatment device including a water reservoir and a suction head. In this way, additional functions are integrated into the flange unit in the form of a single component, so that space and costs may be saved and the practicability of the flange unit may be enhanced.

The flange unit includes a base plate having a central recess for accommodating a filling piece of the suction head, a connecting unit for detachably connecting the flange unit to an inner side of the water reservoir, a closure element for closing the recess, and a handle unit for detaching the connecting unit from the holding unit and for carrying the filter unit. In this way, further additional functions are incorporated into the flange unit to further enhance the practicability.

The filter unit may also be referred to solely as a filter.

According to one advantageous specific embodiment of the present invention, it may be possible that the handle unit includes a first arm element, a second arm element, and a hand grip element, the first arm element being movably connected at a first end via a first hinge and the second arm element being movably connected at a first end using a second hinge to the base plate, and the first arm element being movably connected at a second end via a third hinge and the second arm element being movably connected at a second end using a fourth hinge to the hand grip element. In this way, the handle unit may either be situated flatly when the filter unit having the flange unit is located in the water treatment device, or may be set up at an angle, so that a user may remove the filter unit together with the flange unit from the water treatment device. The hand grip element is hereby arrangeable in relation to the base plate to enhance the carrying comfort.

According to another advantageous specific embodiment of the present invention, an end position display may be provided including a first longitudinal web and a second longitudinal web, both the first and the second longitudinal webs being situated on the base plate in such a way that the first and second longitudinal webs adjoin a flange holding device of the water reservoir when the flange unit is positioned in the flange holding device. In this way, it may be displayed to the user of the water treatment device in a simple manner whether the flange unit is properly positioned in the water treatment device. Flange units which are not properly positioned may have the result that water does not pass through the filter unit, but rather enters the water reservoir directly and unfiltered.

Further advantages result from the following description of the figures. Various exemplary embodiments of the present invention are shown in the figures. The figures, the description, and the claims contain numerous features in combination. Those skilled in the art will advantageously also consider the features individually and combine them to form reasonable further combinations.

BRIEF DESCRIPTION OF THE DRAWINGS

In the figures, identical and equivalent components are identified by identical reference numerals.

FIG. 4 shows a perspective view of the water reservoir of the water treatment device in a second alignment;

DETAILED DESCRIPTION

Figure 1:
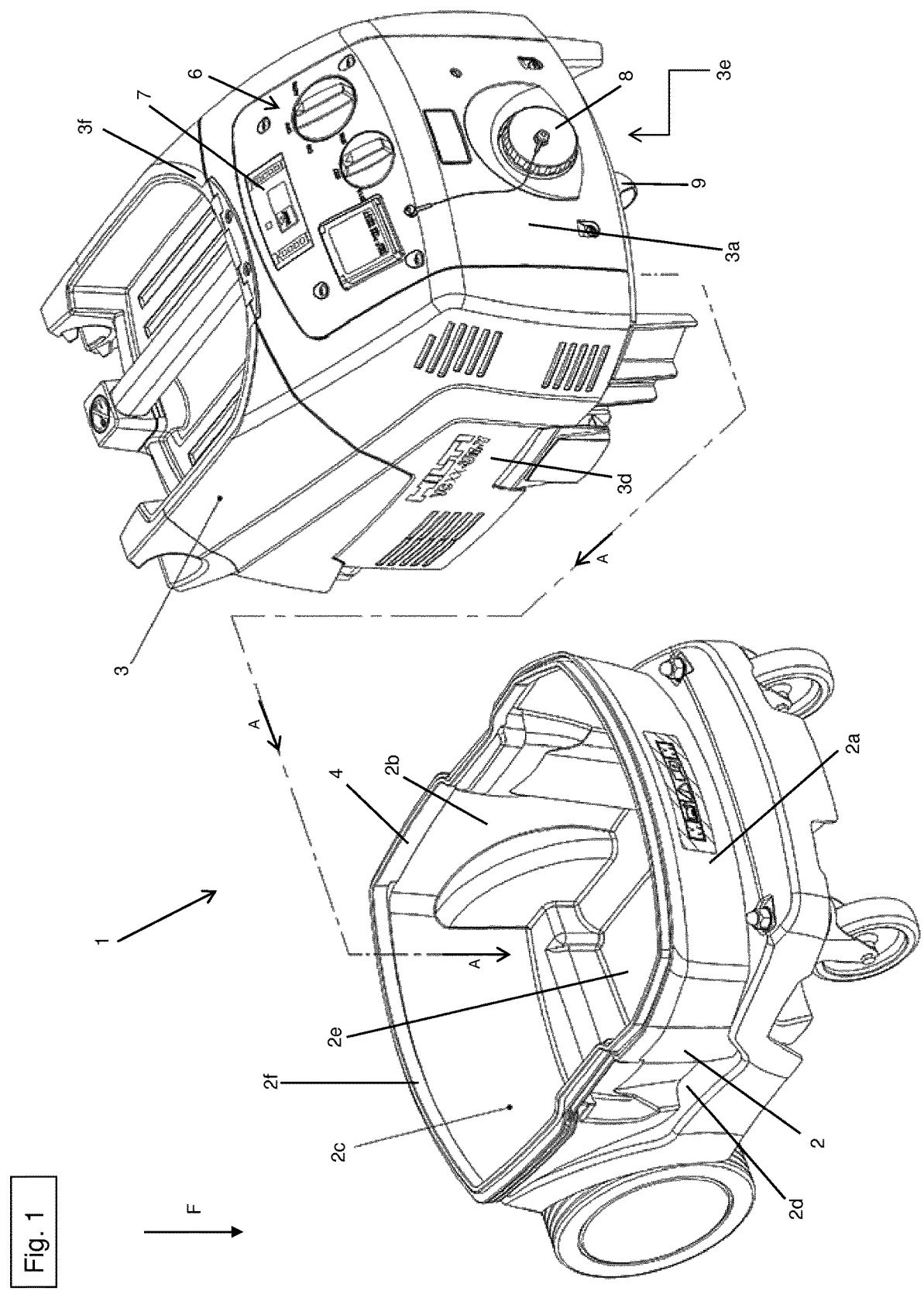
FIG. 1 shows a perspective view of a water treatment device including a suction head and a water reservoir in a disassembled state.

FIG. 1 shows a water treatment device 1 in a disassembled state. Water treatment device 1 essentially includes a water reservoir 2 and a suction head 3. Suction head 3 may also be referred to as a device head.

Figure 3:
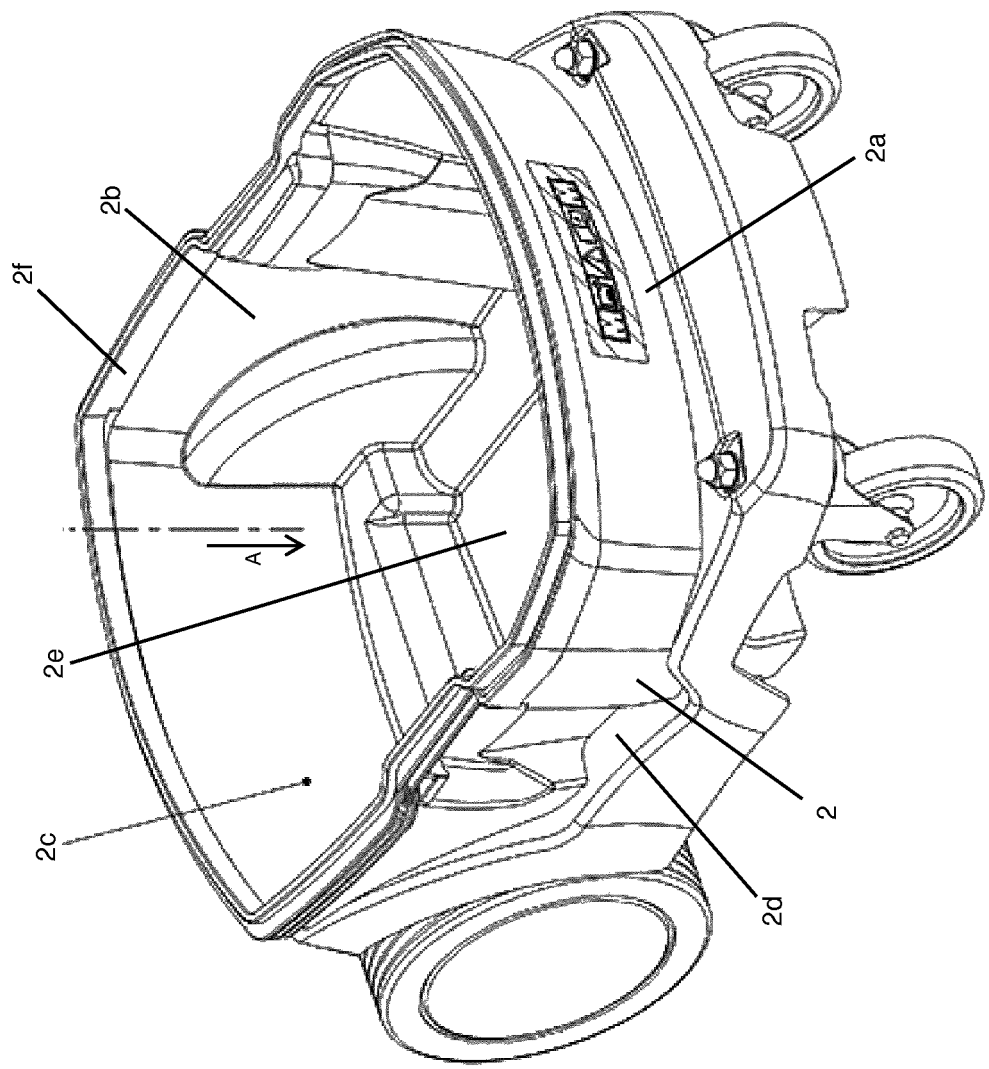
FIG. 3 shows a perspective view of the water reservoir of the water treatment device in a first alignment.

As shown in FIGS. 1, 3, and 4, water reservoir 2 is essentially designed in the form of a trough and is used to store or accommodate water. Water reservoir 2 includes a first, second, third, fourth side wall 2a, 2b, 2c, 2d and a base 2e. Furthermore, water reservoir 2 includes a peripheral edge 2f. A receptacle 4 for a flange holding device 5 is positioned on the inner side of first side wall 2a. Both receptacle 4 and flange holding device 5 will be described in detail hereafter.

Four wheels, using which water reservoir 2 or, in the assembled state, entire water treatment device 1 may be moved, are provided on the lower side of water reservoir 2.

In the assembled state, suction head 3 is positioned on water reservoir 2 and is detachably connected to water reservoir 2.

Figure 2:
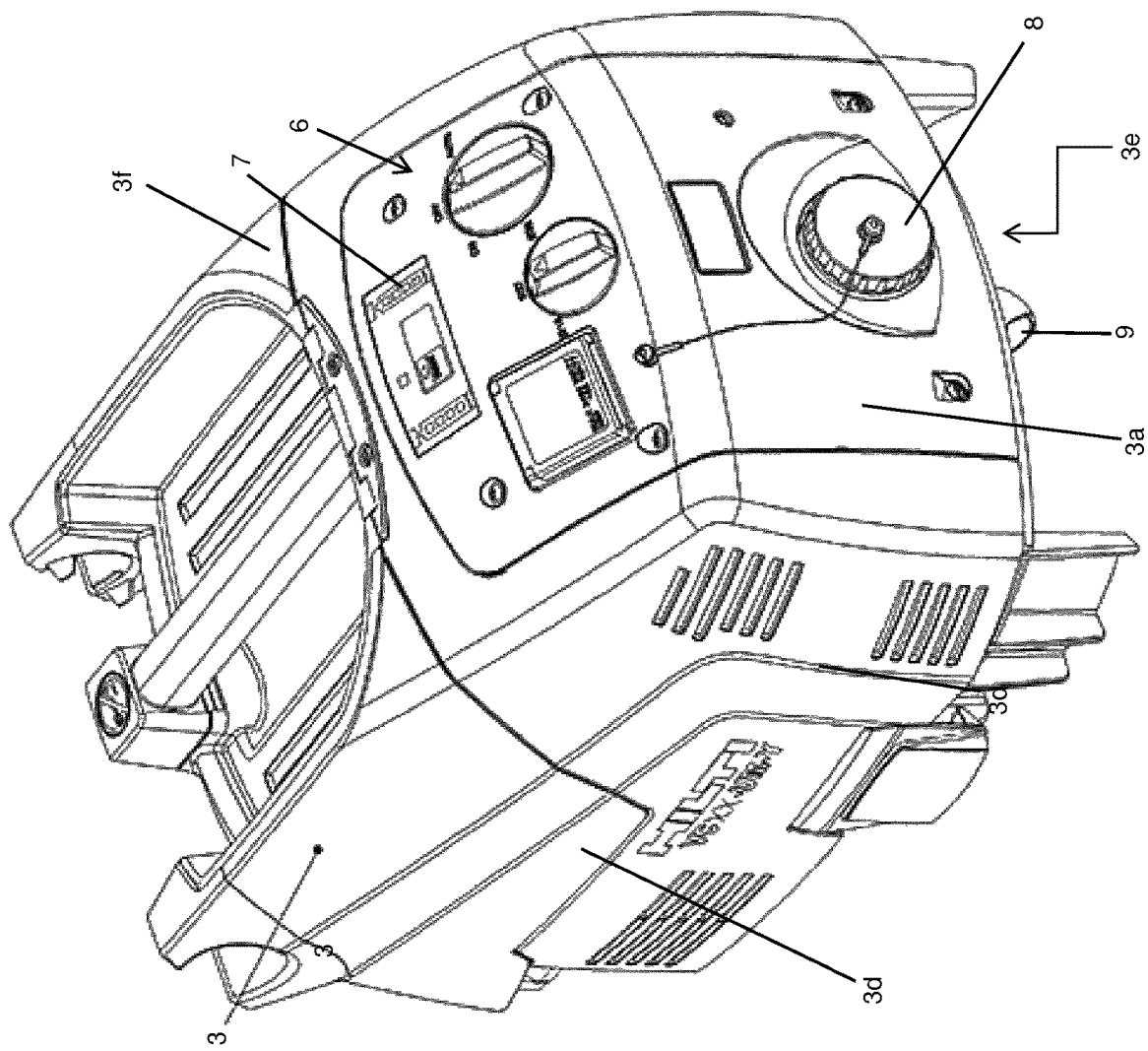
FIG. 2 shows a perspective view of the suction head of the water treatment device.
Figure 7:
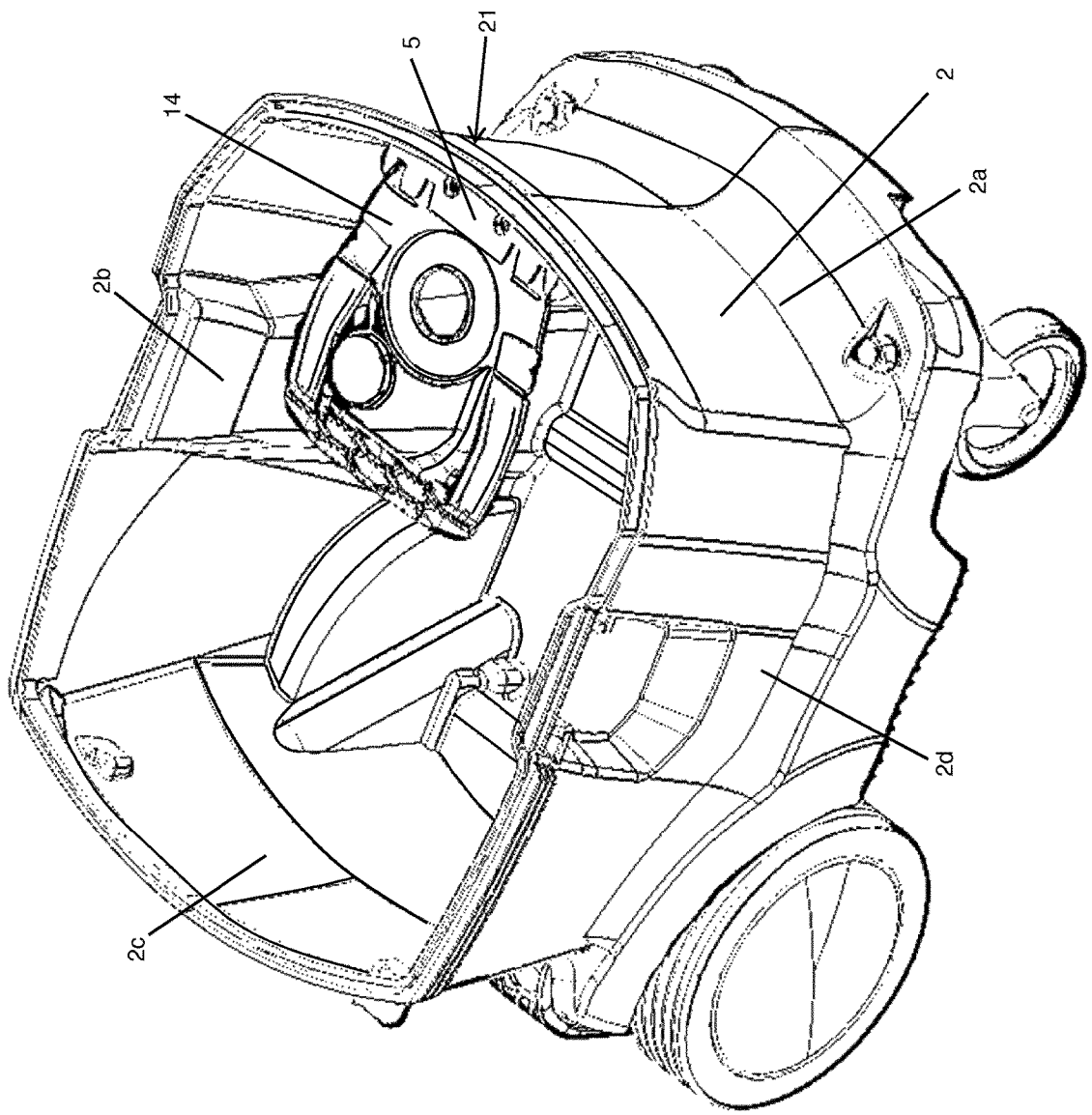
FIG. 7 shows a second perspective view of the water reservoir together with a flange unit of the filter unit.
Figure 8:
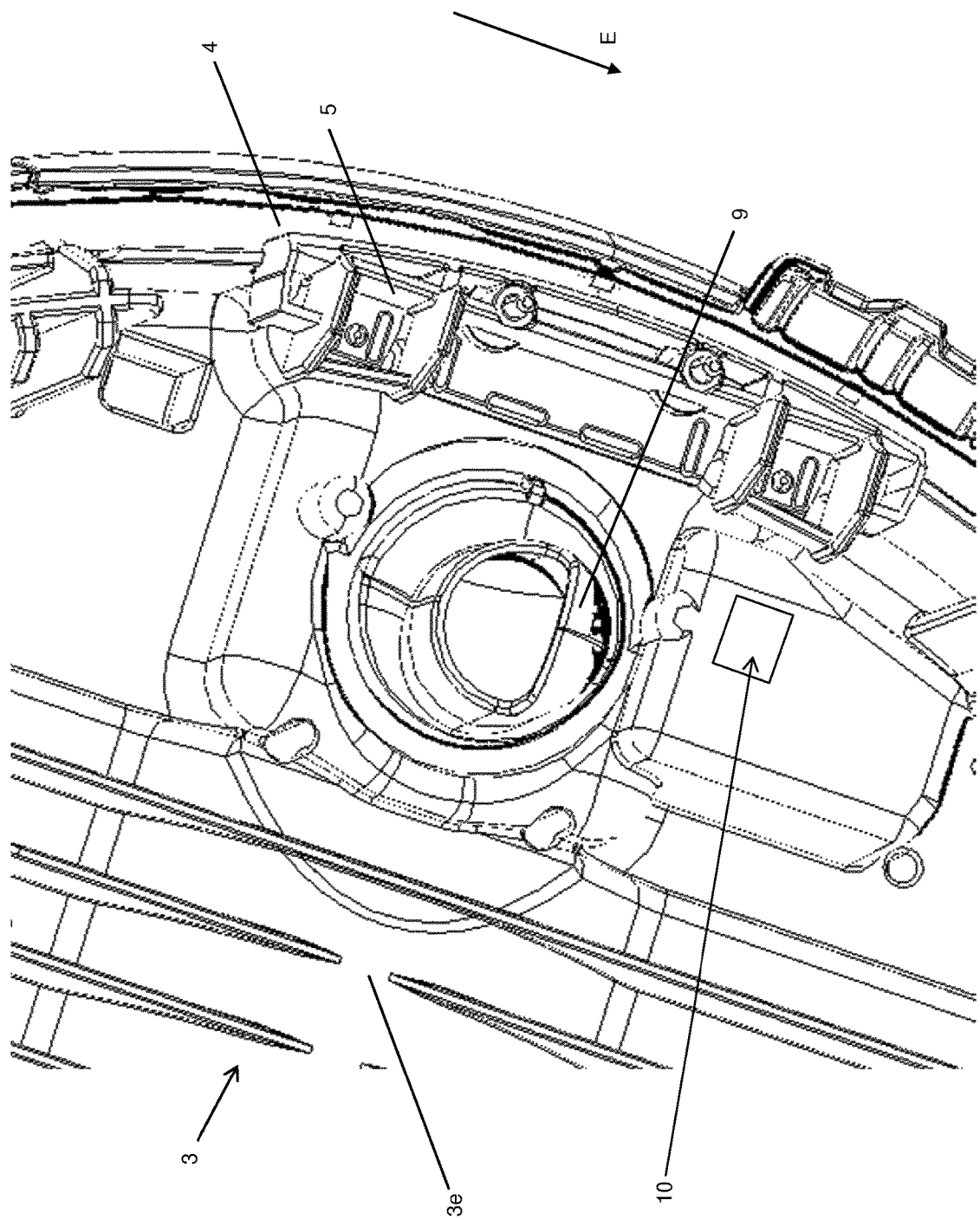
FIG. 8 shows a first bottom view of a part of the suction head.
Figure 9:
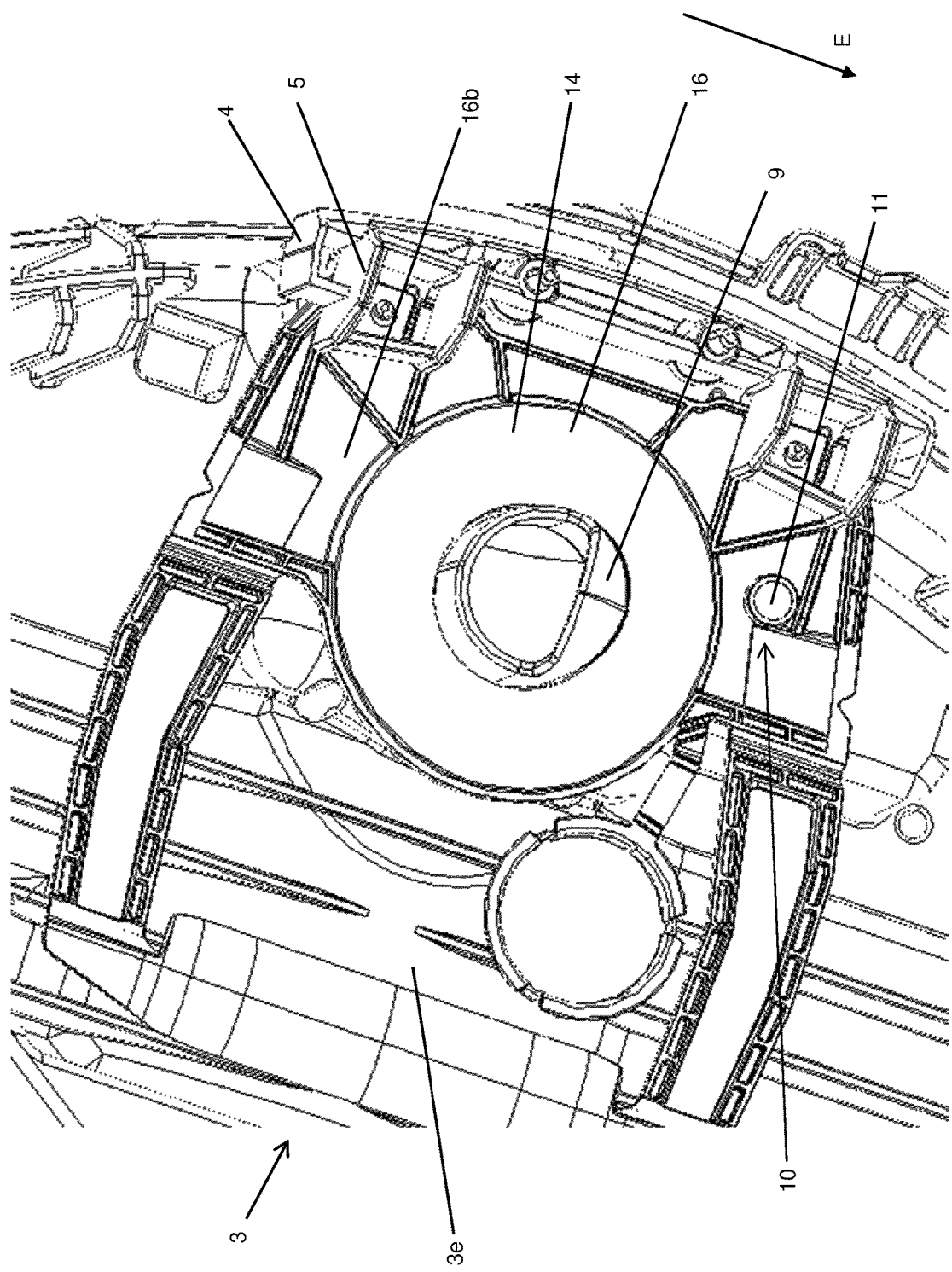
FIG. 9 shows a second bottom view of a part of the suction head together with the flange unit of the filter unit.
Figure 10:
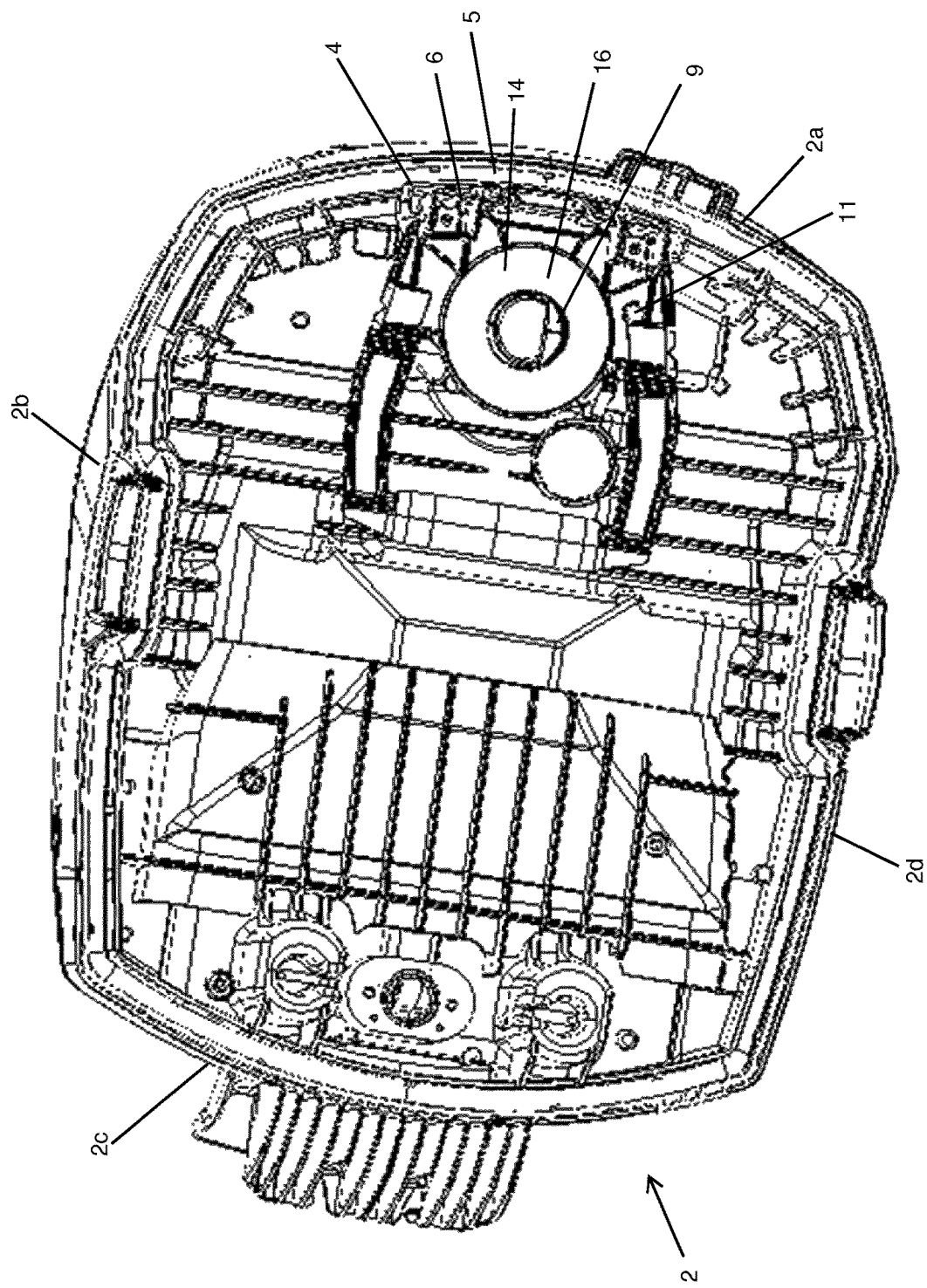
FIG. 10 shows a comprehensive bottom view of the suction head together with the flange unit of the filter unit.

As shown in FIGS. 1 and 2, suction head 3 includes a first, second, third, fourth side wall 3a, 3b, 3c, 3d, a lower side 3e, and a cover 3f. Furthermore, suction head 3 includes a pump, using which water may be pumped. However, it is also possible that water treatment device 1 includes more than one pump. The pump is not shown in the figures. Various operating elements 6, a display unit 7, and a water fitting 8 for the soiled water from the power tools (not shown) are provided on the first side wall. Water fitting 8 leads to a line (not shown), which finally opens into a filling piece 9 on lower side 3e of suction head 3 (cf. FIG. 2). As shown in FIGS. 7, 8, and 9, filling piece 9 is implemented in the form of a cylindrical tube. Furthermore, a sensor 10 in the form of a magnetic sensor is positioned on lower side 3e of suction head 3. In the exemplary embodiment shown, sensor 10 is a Hall sensor. Sensor 10 is used to detect a signal of a magnet 11, i.e., a magnetic field, and is positioned adjacent to filling piece 9 in arrow direction E. Sensor 10 is connected to a control unit in suction head 3. When sensor 10 detects or receives the signal of a signal generator, sensor 10 transmits the detected signal to the control unit. Water treatment device 1 is switched by the control unit either into an operating mode or in idle mode in accordance with the received signal. In the operating mode, water is conveyed with the aid of the pump from the water reservoir to power tools, which are connected to water treatment device 1. Subsequently, the water is conveyed back from the power tools again with the aid of the pump and filtered in a filter unit 13. The filtered water subsequently enters water reservoir 2 again, so that the filtered water may be conveyed back to the power tools. The water moves in a circuit between the power tools and water treatment device 1. In the idle mode, water is not conveyed by the pump. Both the operating mode and the idle mode are visually and/or acoustically displayed on display unit 7. However, it is also possible that water treatment device 1 includes additional modes in addition to the operating mode and the idle mode. It is thus possible, for example, that water treatment device 1 includes a mode in which water is solely conveyed from water reservoir 2 to the power tools, but is not subsequently conveyed back to water treatment device 1. In this mode, a filter unit 13 is not required in water treatment device 1, however, it may also remain present in water treatment device 1.

Figure 5:
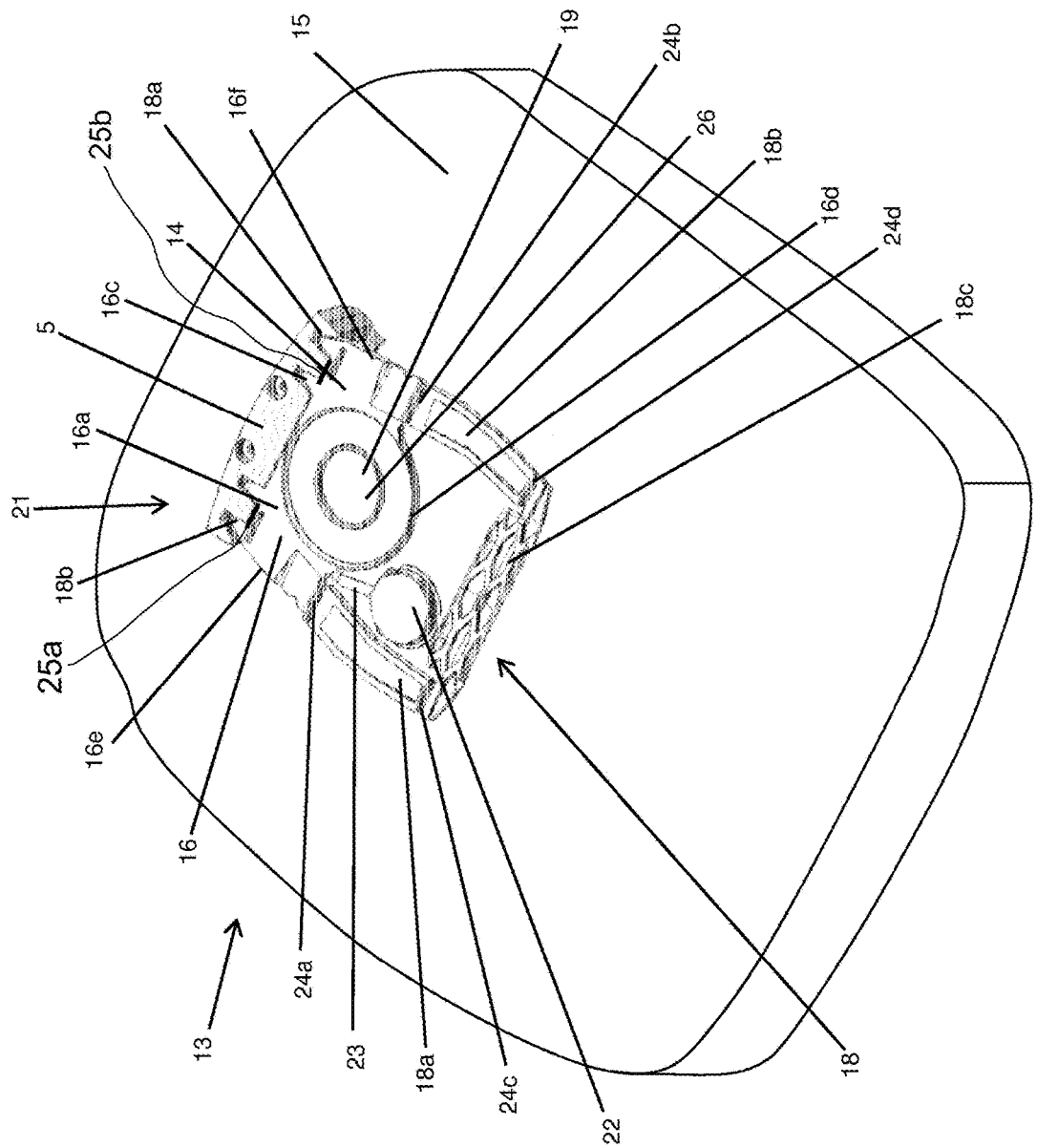
FIG. 5 shows a filter unit in the form of a filter bag together with a flange unit and a flange holding device.
Figure 6:
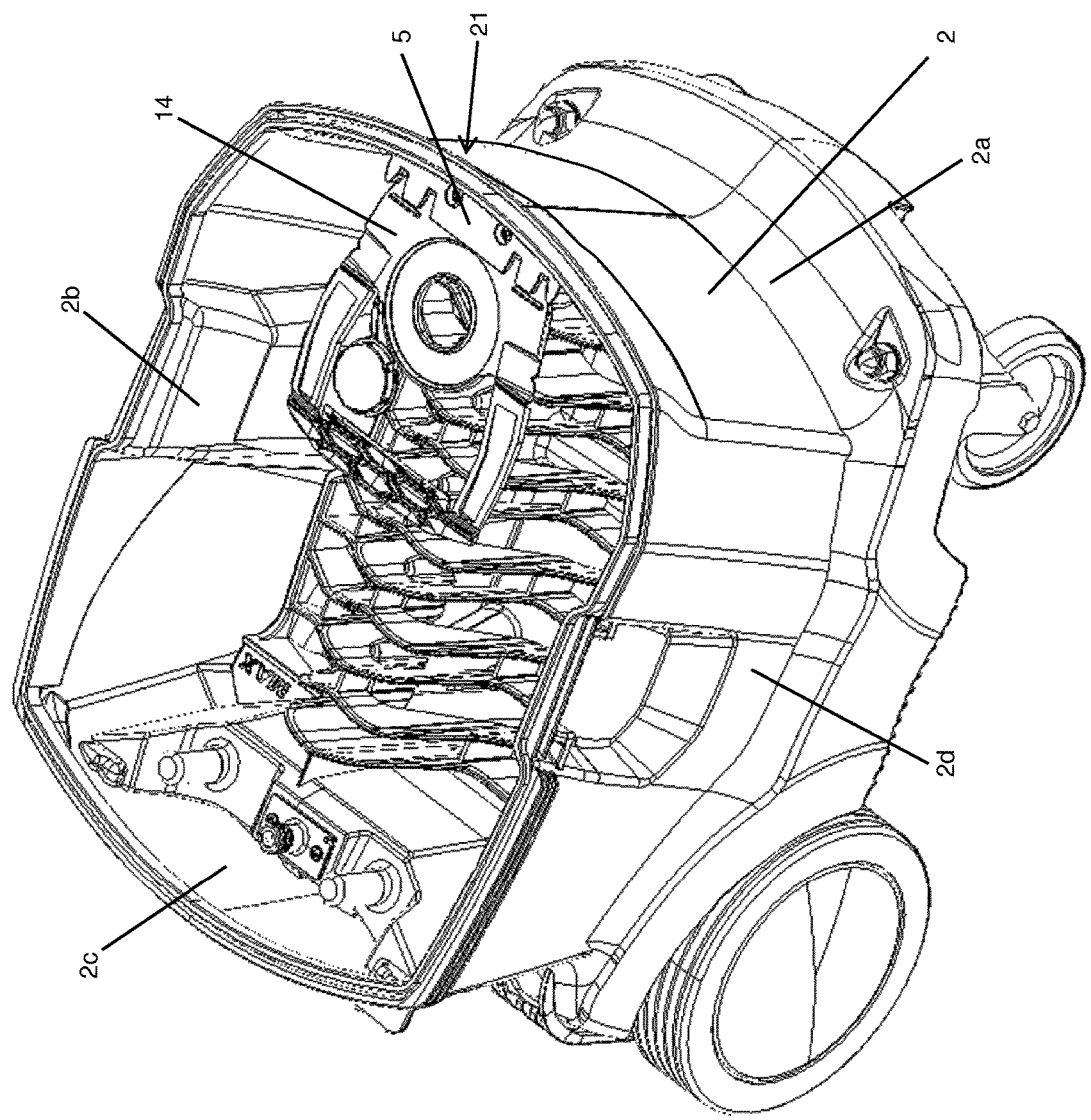
FIG. 6 shows a first perspective view of the water reservoir together with a flange unit of the filter unit.

Filter unit 13 may be positioned in the interior of water reservoir 2. As shown in FIG. 5, filter unit 13 is essentially includes a flange unit 14 and a filter bag 15. Filter bag 15 may also be referred to as a filter sack. As already described above, filter unit 13 is used to filter the water which is conveyed from the power tools or the tools, for example, drill bit or saw blade, back into water treatment device 1. The water may flow through the material of filter bag 15 for this purpose, while in contrast the dirt is held back in the material of filter bag 15.

Figure 11:
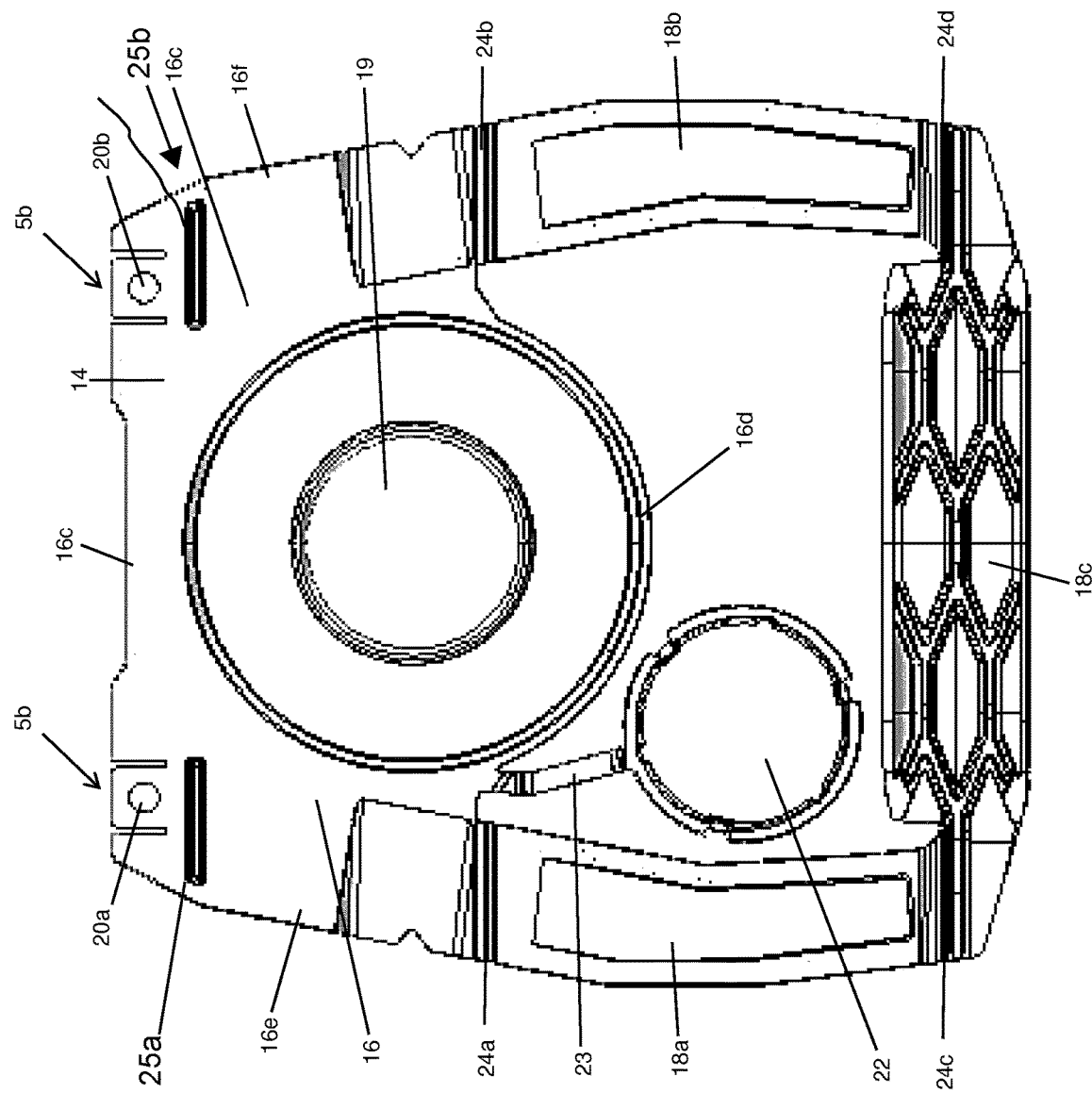
FIG. 11 shows a top view of the flange unit of the filter unit.
Figure 12:
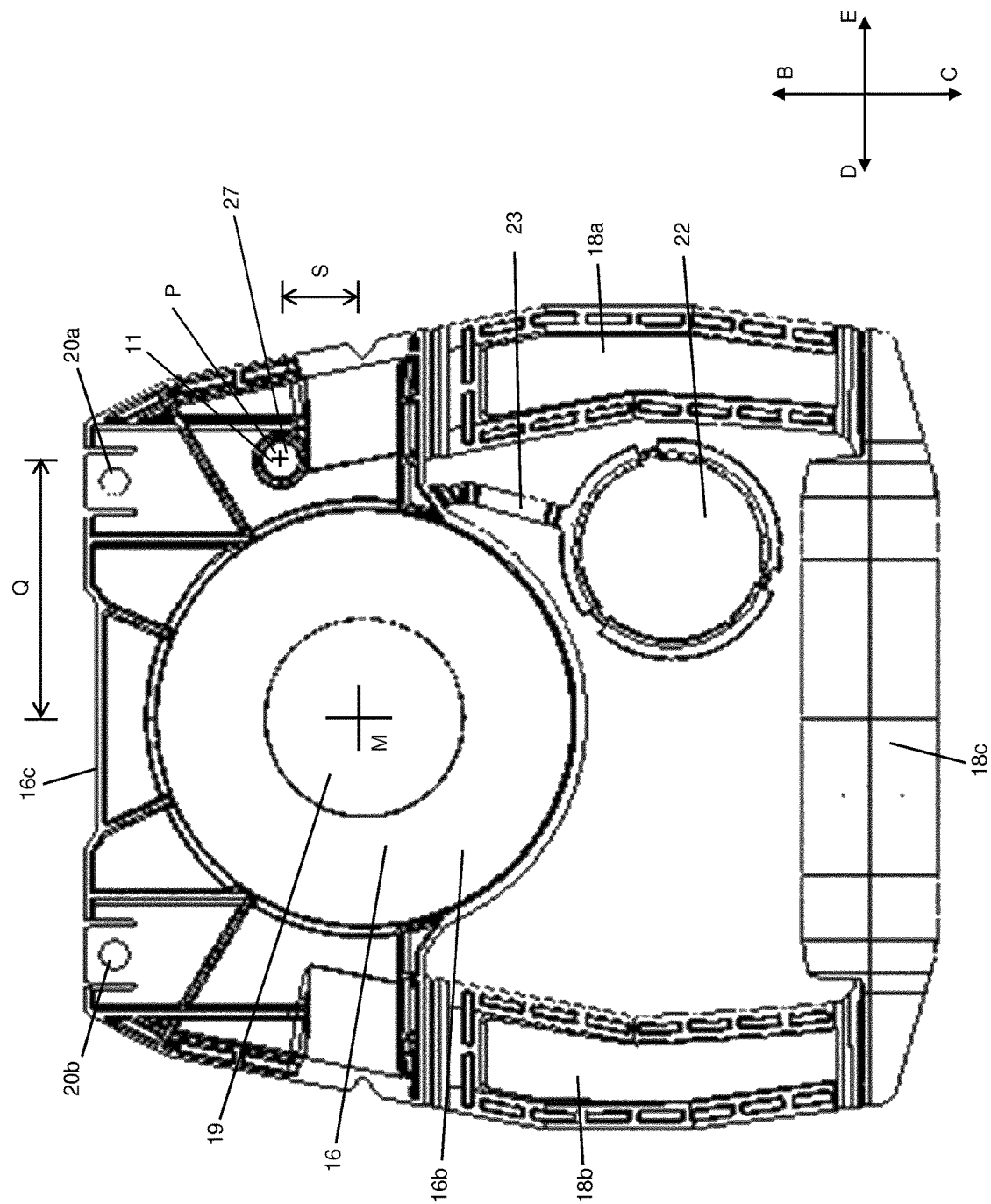
FIG. 12 shows a bottom view of the flange unit of the filter unit.

As shown in FIGS. 11 and 12, flange unit 14 essentially includes a base plate 16 having an upper side 16a, a lower side 16b, a front edge 16c, a rear edge 16d, a first side edge 16e, a second side edge 16f, and a handle unit 18. A central circular recess 19 is located in the middle of base plate 16. Recess 19 may also be referred to as a hole. Recess 19 is used to accommodate filling piece 9 of suction head 3, so that the soiled water of the power tools may enter filter unit 13 via filling piece 9 and through recess 19. A first attachment element 20a and a second attachment element 20b are provided at the two outer ends of front edge 16c. Both first and second attachment elements 20a, 20b are part of a connecting unit 21, using which flange unit 14 of filter unit 13 may be detachably connected to flange holding device 5 of water reservoir 2. Connecting unit 21 is essentially designed in the form of a snap connection.

Furthermore, a closure element 22 is provided for closing recess 19 on flange unit 14. Closure element 22 is connected with the aid of an oblong connecting web 23 to base plate 16. Connecting web 23 is flexibly designed and is at least sufficiently long that closure element 22 may be positioned adjacent to base plate 16 when recess 19 is not to be closed.

Figure 13:
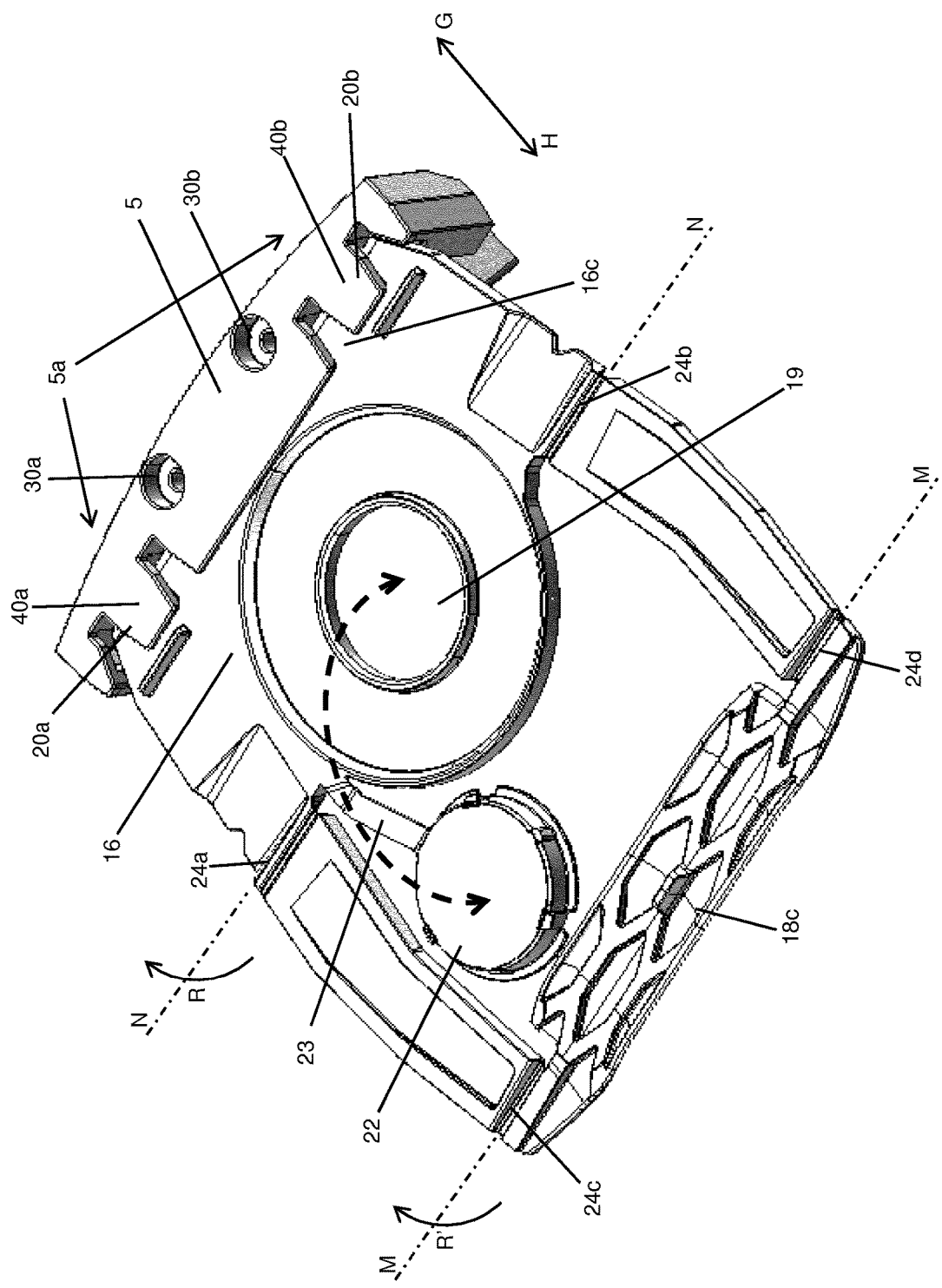
FIG. 13 shows a perspective view of the upper side of the flange unit of the filter unit together with a flange holding device.

Handle unit 18 is used for detaching connecting unit 21 from flange holding device 5 and for carrying filter unit 13. Handle unit 18 includes a first arm element 18a, a second arm element 18b, and a hand grip element 18c, first arm element 18a being movably connected at a first end via a first hinge 24a and second arm element 18b being movably connected at a first end using a second hinge 24b to base plate 16, and first arm element 18a being movably connected at a second end via a third hinge 24c and second arm element 18b being movably connected at a second end using a fourth hinge 24d to hand grip element 18c. Hinges 24a, 24b, 24c, 24d are designed as film hinges. As shown in FIG. 13, first and second arm elements 18a, 18b may be reversibly pivoted or rotated with the aid of first and second hinge 24a, 24b, respectively, in relation to base plate 16 around rotational axis N and in direction R. Furthermore, hand grip element 18c may be reversibly pivoted or rotated with the aid of third and fourth hinges 24c, 24d in relation to first and second arm elements 18a, 18b around rotational axis M and in direction R'.

In addition, an end position display is provided on upper side 16a of base plate 16. End position display includes a first longitudinal web and a second longitudinal web, both first and also second longitudinal webs being situated on the base plate in such a way that first and second longitudinal webs adjoin a flange holding device 5 of water reservoir 2 when flange unit 14 is positioned in flange holding device 5.

Filter bag 15 is manufactured from a flexible material, through which water may pass, but not dirt particles. Filter bag 15 includes a circular opening 26 and is fastened on lower side 16b of base plate 16 of flange unit 14. Opening 26 is used to accommodate filling piece 9 of suction head 3, so that the soiled water may enter the interior of filter bag 15. Circular opening 26 of filter bag 15 is situated below central, circular recess 19 of base plate 16, so that opening 26 and recess 19 overlap. Opening 26 of filter bag 15 is smaller in diameter than the diameter of recess 19 of flange unit 14. The diameter of opening 26 essentially corresponds to the diameter of filling piece 9 of suction head 3. The filter bag material protruding into recess 19 is used as a seal between filling piece 9 and recess 19 of flange unit 14 when filter unit 13 is connected to suction head 3.

Figure 14:
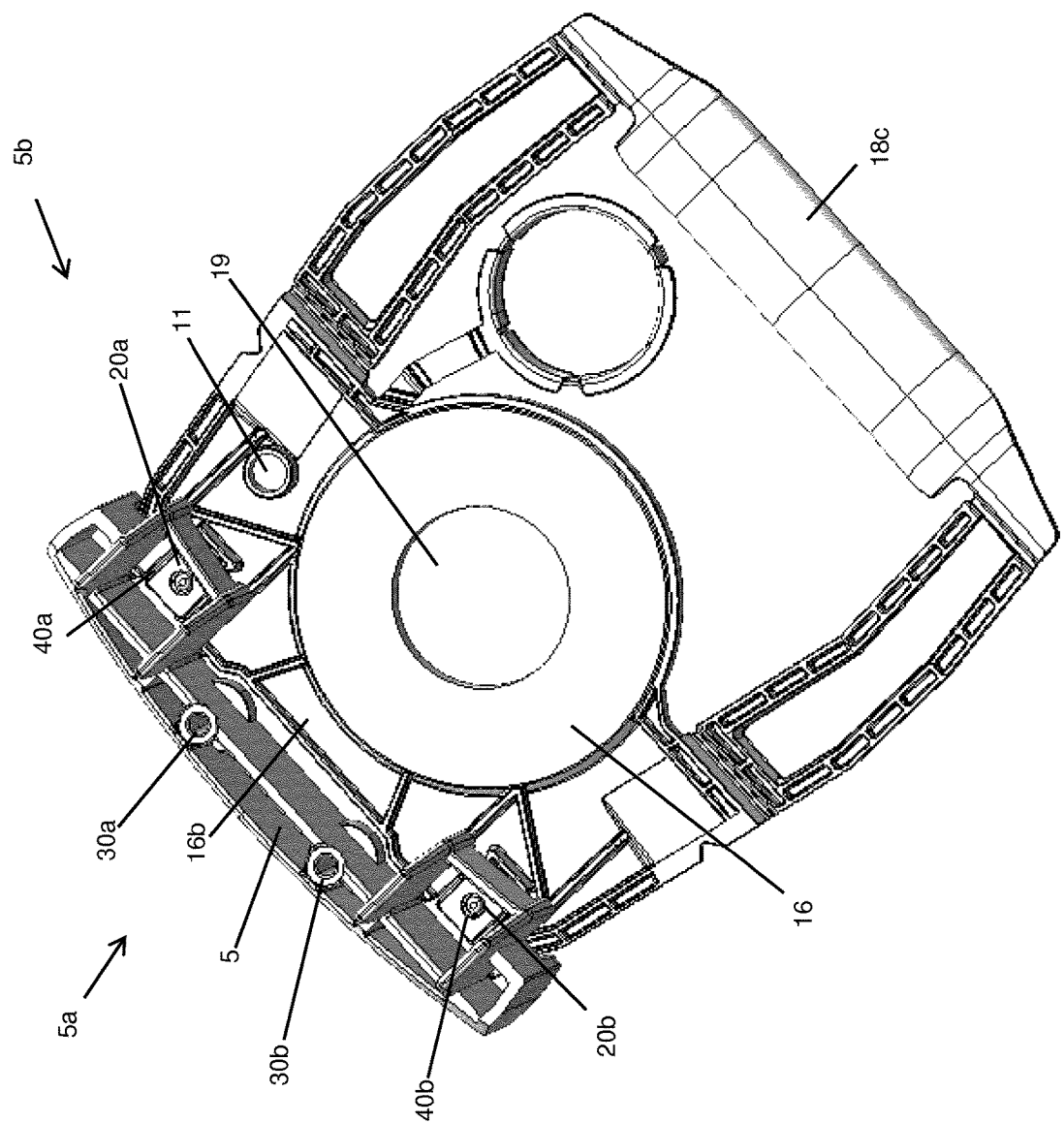
FIG. 14 shows a perspective view of the lower side of the flange unit of the filter unit together with the flange holding device.

As shown in FIGS. 12 and 14, base plate 16 includes a circular receptacle 27 for a signal generator on lower side 16b. The signal generator is designed in the form of circular magnet 11 and is positioned in receptacle 27. Signal generator 11 designed as a magnet has a circular cross-sectional area and a center point P. Circular recess 19 of base plate 16 also has a circular cross-sectional area having a center point M. Center point P has a distance of 16 mm in arrow direction B, i.e., route S, and a distance of 50 mm in arrow direction D, i.e., route Q, from center point M. In an assembled state, i.e., when filter unit 13 is located in water reservoir 2 and suction head 3 is located on water reservoir 2, magnet 11 is positioned in direction F below sensor 10 of suction head 3, so that sensor 10 may detect magnet 11 or signals of magnet 11.

The thickness of base plate 16 and the magnetic force of magnet 11 are selected in such a way that the magnetic field of magnet 11 may pass through base plate 16 and arrive at sensor 10 in sufficient strength.

Figure 15:
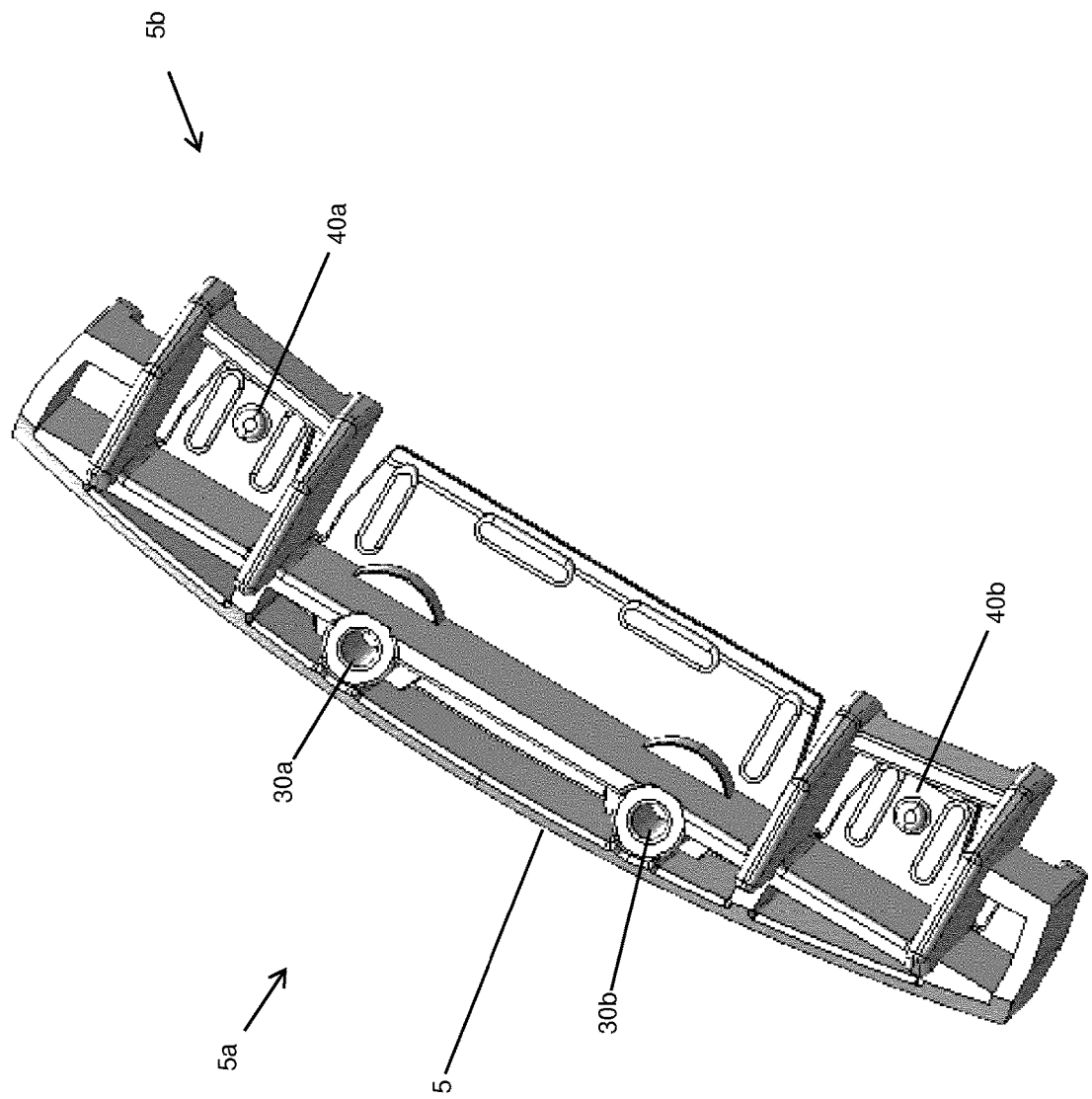
FIG. 15 shows a perspective view of the flange holding device.
Figure 16:
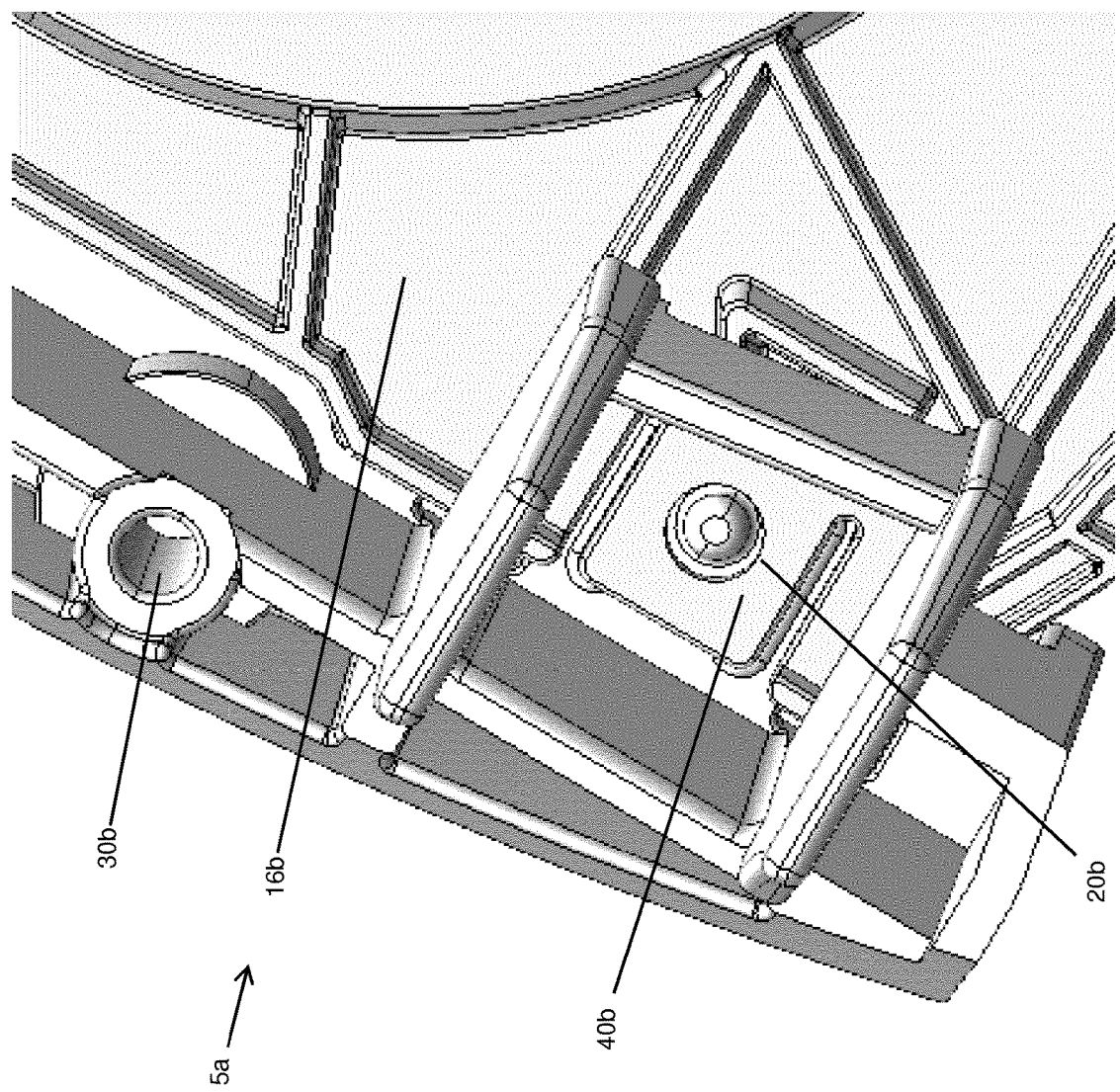
FIG. 16 shows a detail view of the flange holding device including the flange unit.

As shown in FIG. 15, flange holding device 5 includes a first holding unit 5a and a second holding unit 5b. First holding unit 5a includes two receptacle elements 30a, 30b and is used for fastening on receptacle 4. The two receptacle elements 30a, 30b are plugged into two corresponding pins of receptacle 4 in arrow direction F. Second holding unit 5b has two receptacle elements 40a, 40b, in which first and second attachment elements 20a, 20b, respectively, may be positioned. The two receptacle elements 40a, 40b are also part of above-described connecting system 21, using which flange unit 14 of filter unit 13 may be detachably connected to flange holding device 5 of water reservoir 2.

Installation and Functionality of Filter Unit 13

To position filter unit 13 in the water treatment device, the suction head is initially removed from the water reservoir against direction A (cf. FIG. 1).

Flange holding device 5 is plugged onto receptacle 4 in arrow direction F.

Flange unit 14 of filter unit 13 is fastened on flange holding device 5. In FIGS. 13 and 14, flange unit 14 is in a plugged-together state with flange holding device 5. Filter unit 13 is thus located in water reservoir 2.

Subsequently, suction head 3 is again positioned and fastened on water reservoir 2. Sensor 10 in suction head 3 is located in the assembled state of water treatment device 1 against arrow direction F above the signal generator designed as magnet 11 (cf. FIGS. 8 and 9) to detect the signals of the signal generator, i.e., the magnetic field. If the magnetic field, i.e., signal, of the signal generator designed as magnet 11 is detected by sensor 10, a corresponding signal is transmitted to the control unit and the operating mode for water treatment device 1 is set. If a signal is not detected by sensor 10, a corresponding signal is not transmitted to the control unit and the idle mode is set for water treatment device 1.

The invention claimed is:

1. A flange unit for a filter unit for positioning in a water treatment device, the water treatment device including a water reservoir and a suction head, the flange unit comprising:
   a base plate including a central recess for accommodating a filling piece of the suction head;
   a connector unit for detachably connecting the flange unit to an inner side of the water reservoir;
   a closure element for closing the recess; and
   a handle unit for detaching the connecting unit from a flange holding device and for carrying the filter unit;
   wherein the handle unit includes a first arm element, a second arm element, and a hand grip element, the first arm element being movably connected at a first end via a first hinge and the second arm element being movably connected at a first end using a second hinge to the base plate, and the first arm element being movably connected at a second end via a third hinge and the second arm element being movably connected at a second end using a fourth hinge to the hand grip element;
   wherein the base plate has an upper side, a lower side, a front edge, a rear edge, a first side edge and a second side edge, and
   wherein the connector unit includes a first attachment at the front edge and a second attachment at the front edge.

2. The flange unit as recited in claim 1 further comprising an end position display including a first longitudinal web and a second longitudinal web, both the first and the second longitudinal webs being situated on the base plate in such a way that the first and second longitudinal webs adjoin a flange holding device of the water reservoir when the flange unit is positioned in the flange holding device.

3. The flange unit as recited in claim 1 wherein the central recess is a circular hole.

4. The flange unit as recited in claim 1 wherein the connector unit is in the form of a snap connection.

5. The flange unit as recited in claim 1 wherein the closure element is connected via a connecting web to the base plate.

6. The flange unit as recited in claim 5 wherein the connecting web is flexible.

7. The flange unit as recited in claim 6 wherein the connecting web has a length so that closure element is positionable adjacent to base plate when recess is not to be closed.

8. A water treatment device comprising the flange unit as recited in claim 1 and the water reservoir and the suction head.

* * * * *